United States Patent
Hahn et al.

(10) Patent No.: US 7,211,916 B2
(45) Date of Patent: May 1, 2007

(54) ARRANGEMENT WITH AN ELECTRIC MOTOR

(75) Inventors: Alexander Hahn, Sauldorf (DE); Matthias Nickel-Jetter, Villingen-Schwenningen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 129 days.

(21) Appl. No.: 11/179,908

(22) Filed: Jul. 11, 2005

(65) Prior Publication Data
US 2006/0017341 A1    Jan. 26, 2006

(30) Foreign Application Priority Data
Jul. 21, 2004   (DE)  ................. 10 2004 036 887

(51) Int. Cl.
  *H02K 5/26*   (2006.01)
  *H02K 5/00*   (2006.01)
(52) U.S. Cl. ........................................... 310/91
(58) Field of Classification Search .............. 310/91; 248/346.04
  See application file for complete search history.

(56) References Cited
U.S. PATENT DOCUMENTS

| | | | | |
|---|---|---|---|---|
| 4,628,592 A | * | 12/1986 | Mahon | ............ 29/596 |
| 4,992,686 A | * | 2/1991 | Heine et al. | ........... 310/49 R |
| 5,126,607 A | * | 6/1992 | Merriman, Jr. | ........... 310/51 |
| 6,031,306 A | * | 2/2000 | Permuy | ........... 310/67 R |
| 2004/0189125 A1 | | 9/2004 | Doemen | |

FOREIGN PATENT DOCUMENTS

| | | |
|---|---|---|
| DE | 1 046 530 | 12/1958 |
| DE | 1 151 863 | 7/1963 |
| DE | 33 32 036 A1 | 3/1984 |
| DE | 44 03 397 A1 | 8/1995 |
| DE | 196 30 030 A1 | 1/1998 |
| DE | 203 12 752 U | 10/2003 |
| GB | 972 378 | 10/1964 |

OTHER PUBLICATIONS

Köhler & Rögnitz, "6.2.1 Sicherungen gegen axiales Verschieben" [Securing against axial displacement] in Maschinenteile [Machine Parts], ISBN 3-519-06341-7, publ. 1992 by B.G. Teubner, Stuttgart, Germany, pp. 216-218.

* cited by examiner

*Primary Examiner*—Burton Mullins
(74) *Attorney, Agent, or Firm*—Milton Oliver, Esq.; Ware Fressola Van Der Sluys & Adolphson LLP

(57) ABSTRACT

An arrangement with an electric motor facilitates mounting of the motor, particularly of a miniature or subminiature motor. The motor (20) has a stator (56), a rotor (24), and a support flange (36) coupled to the motor. A motor mount (22) is formed with an opening (94) for engagement with the support flange (36). The opening has, on its rim, a motor-side shoulder (96) that has a substantially frustoconical shape and faces axially toward the motor (20) after mounting. The support flange (36) is shaped for guidance of a snap-lock element (82) that extends along at least a portion of the circumference of the support flange (36) and is resiliently deflectable radially inward, by means of an inwardly directed force. The snap-lock element (82) is so configured that it snap-locks outward against the motor-side shoulder (96) of the opening (94) when the motor is mounted.

29 Claims, 12 Drawing Sheets

ARRANGEMENT WITH AN ELECTRIC MOTOR

CROSS-REFERENCE

This application claims priority from German application DE 10 2004 036 887.2, filed 21 Jul. 2004, the contents of which are incorporated by reference.

FIELD OF THE INVENTION

The present invention relates generally to an arrangement with an electric motor, and in particular to a mounting arrangement for a so-called miniature or subminiature motor.

BACKGROUND

Miniature motors of this kind are used for a variety of tasks, for example to drive miniature or subminiature fans; to drive pumps, for example in medical devices; as actuating motors, etc. Such a motor can have a weight, for example, in the range from approximately 50 grams to approximately 250 grams.

Because of their relatively low outputs, such motors are sensitive to contamination, such as can often occur, for example, in a washing machine; an effort is therefore made to arrange such motors in a sealed space so that no dirt can reach them. This applies in particular to motors that use a permanent-magnet rotor, since such a rotor attracts iron particles that can block or interfere with rotation of the rotor.

Small motors of this kind usually have a flange, which is also referred to as a support flange. It is usual to mount a motor of this kind by bolting its flange in place at the point where the motor is needed, for example, in order to lock a door. This requires, however, the creation of threaded holes or the setting of threaded rivets for bolt-on mounting, which is sometimes undesirable because such holes can result in weakening, and after a while can result in permanent breakage.

SUMMARY OF THE INVENTION

It is therefore an object of the invention to provide a new and improved arrangement with an electric motor.

According to the invention, this object is achieved by forming a rim of a mounting recess or cutout with frustoconical surfaces which radially inwardly compress a resilient element on the support flange while the latter is being inserted into the cutout, and having the resilient element radially rebound outward upon full insertion, to thereby snap-lock the motor within the mounting recess or cutout.

Such an arrangement makes possible "blind" installation, i.e. such a motor can simply be pushed into the cutout of the associated apparatus, the snap-lock element then snap-locking the motor therein. The snap-locking element is located in the same protected housing or cavity as the motor, so that the snap-locking element, like the motor, is protected from contamination and corrosion and can easily be detached again, if necessary, for example to swap out any failing component.

BRIEF FIGURE DESCRIPTION

Further details and advantageous refinements of the invention are evident from the exemplifying embodiments, in no way to be understood as a limitation of the invention, that are described below and shown in the drawings.

FIG. 2 shows the motor after it has been mounted on an apparatus (only schematically indicated), and the motor is driving a device 48 (likewise only symbolically indicated), e.g. a water pump or an actuating apparatus;

DETAILED DESCRIPTION

Figure 1:
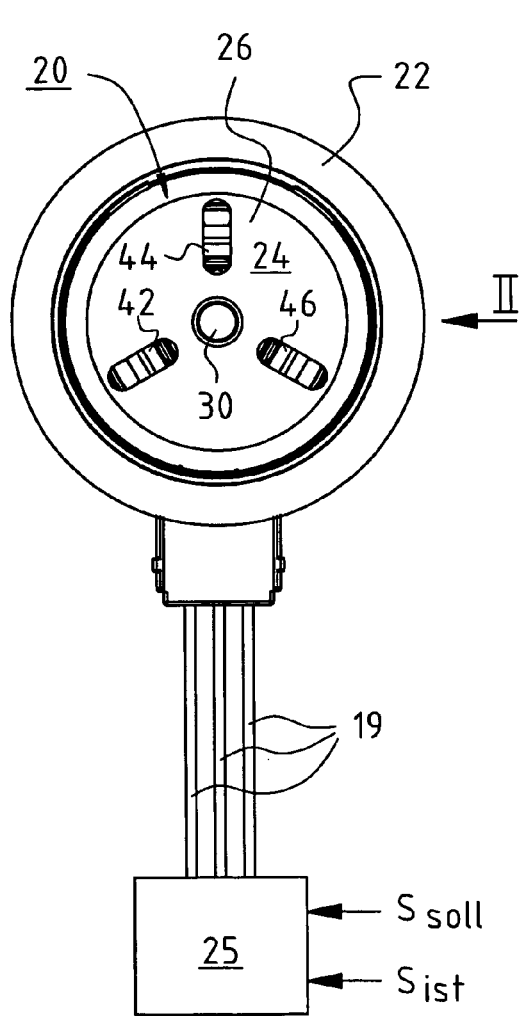
FIG. 1 is a plan view of a miniature motor 20 that is mounted on an apparatus (only symbolically indicated), viewed in the direction of arrow I of FIG. 2.
Figure 2:
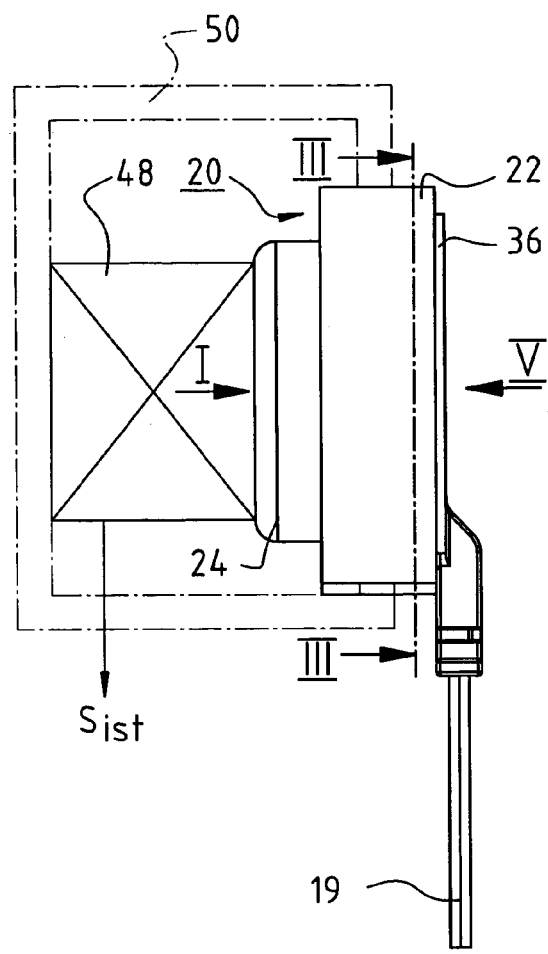
FIG. 2 is a side view looking in the direction of arrow II of FIG. 1.

FIGS. 1 and 2 show, at approximately 1:1 scale, an external-rotor miniature motor 20 that is mounted in a generally annular mount or ring 22 which symbolizes an arbitrary apparatus, such as a wall or part of a housing. In this example, motor 20 is a three-phase motor in a star or delta configuration that is supplied for drive purposes, via three lines 19, with a three-phase current from, for example, an electronic position controller 25, to which a target value Ssoll for a desired position, and an actual value Sist for a current position, are delivered.

Motor 20 has an external rotor 24 having a so-called rotor cup 26 (FIG. 7) made of copper, in which is mounted a magnet ring 28 that is magnetized with, for example, four poles. Such motors are manufactured by the assignee of this application, and are known.

Figure 7:
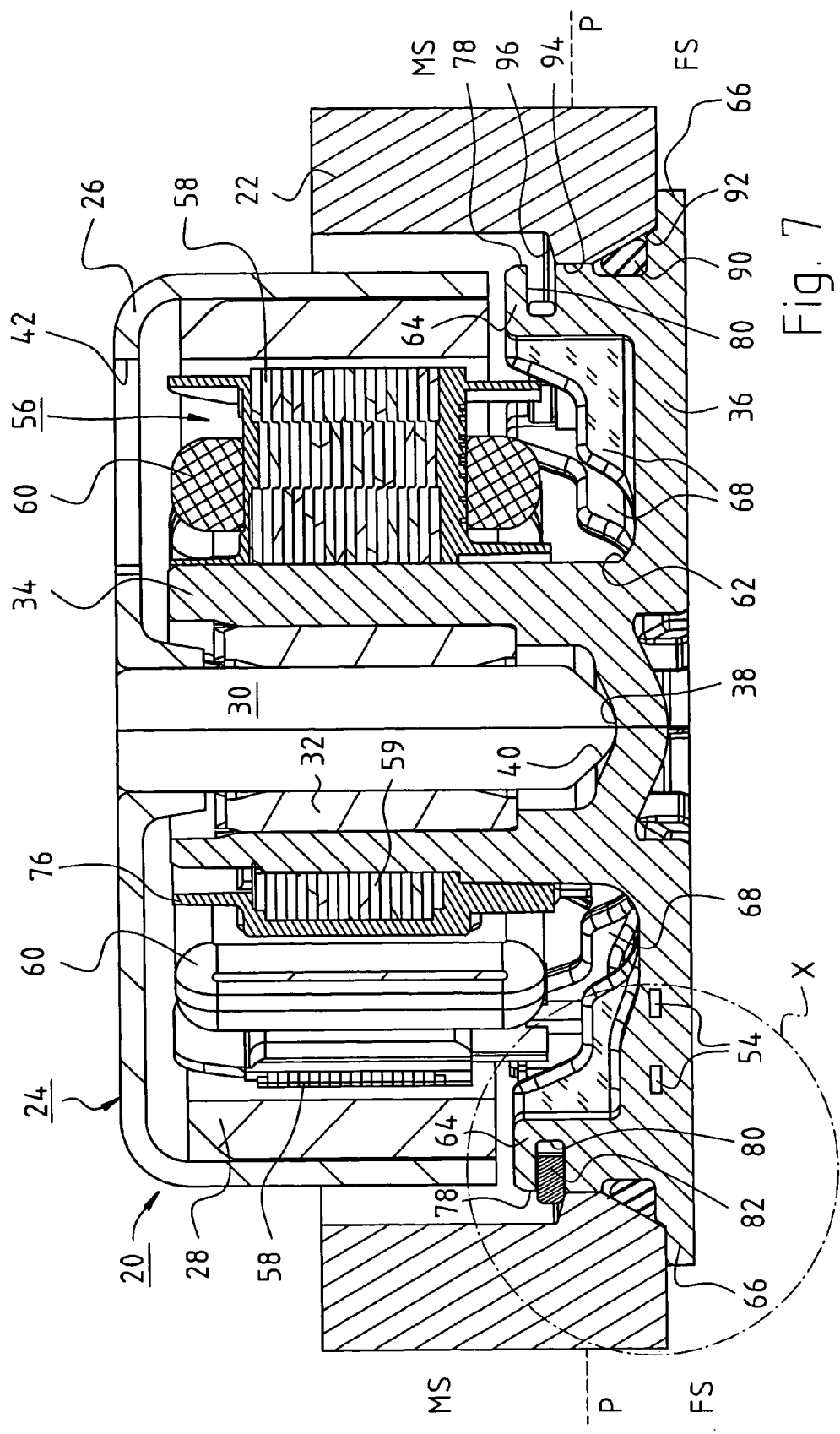
FIG. 7 is a section viewed along line VII—VII of FIG. 5.

As FIG. 7 shows, there is mounted, on rotor cup 26, a shaft 30 that is supported in a plain bearing 32, which in turn is mounted in a bearing tube 34, by being pressed in. Bearing tube 34 is formed integrally with a support flange 36. Parts 34, 36 are produced from a suitable heat-resistant plastic, for example polypropylene.

At its center, support flange 36 has a depression 38 against which shaft 30 rests with its free end 40. Shaft 30 is pressed by the force of permanent magnets 28 against this depression 38, thus forming there an axial bearing for external rotor 24, which bearing is provided with a lubricant (not shown).

As FIG. 1 shows, rotor cup 26 has three elongated cutouts 42, 44, 46 that extend radially at 120° intervals (see FIG. 1).

They serve for coupling with an arbitrary apparatus 48 that is schematically indicated in FIG. 2 and is to be driven by motor 20.

FIG. 2 also shows a closed housing 50 in which apparatus 48 and most of motor 20 are located. Apparatus 48 supplies, during operation, the value Sist for position controller 25.

This housing 50 is only schematically depicted. What is important is that it keeps dirt away from motor 20 and part 48 that is to be driven, and that motor 20 can be quickly and securely installed in housing 50 (of which ring 22 is a part). The connection is intended to be such that it can also absorb the mechanical forces resulting from the operation of motor 20. In addition, installation is preferably also intended to create a liquid-tight connection, and that connection should be disengageable in the event of a defect, e.g. in order to replace motor 20 or apparatus 48.

FIG. 7 shows that electrical conductors 54 are embedded in support flange 36, serving to connect between lines 19 (FIGS. 1 and 2) and an internal stator 56. The latter has six salient stator poles 58 whose shape may best be gathered from FIG. 4. A coil 60 is arranged in known fashion on each pole 58. These coils 60 are supplied with current via lines 19. During operation, stator poles 58 coact in known fashion with magnets 28 of rotor 24, in order to drive rotor 24. A plane P through opening 94 separates a motor-side space (MS), which is typically enclosed to protect against contamination, from a flange-side space (FS) which is typically not protected.

Because the center of the axial extent of rotor magnet 28 is located (in FIG. 7) above the center of the axial extent of stator poles 58 (the ferromagnetic elements of the stator), a continuous magnetic force on rotor 24 is created, which pulls it downward (in FIG. 7) and presses shaft end 40 against depression 38. In the event of impact, this prevents rotor 24 from moving axially in bearing tube 34 and "rattling." It is therefore often possible to dispense with axial retention of rotor 24.

Coils 60 project downward (in FIG. 7) into a trough-like depression 62 of support flange 36. The latter has, at its periphery, a circumferential rim 64 projecting upward with reference to FIG. 7. Flange 36 furthermore has a radially outwardly projecting rim segment 66.

Figure 3:
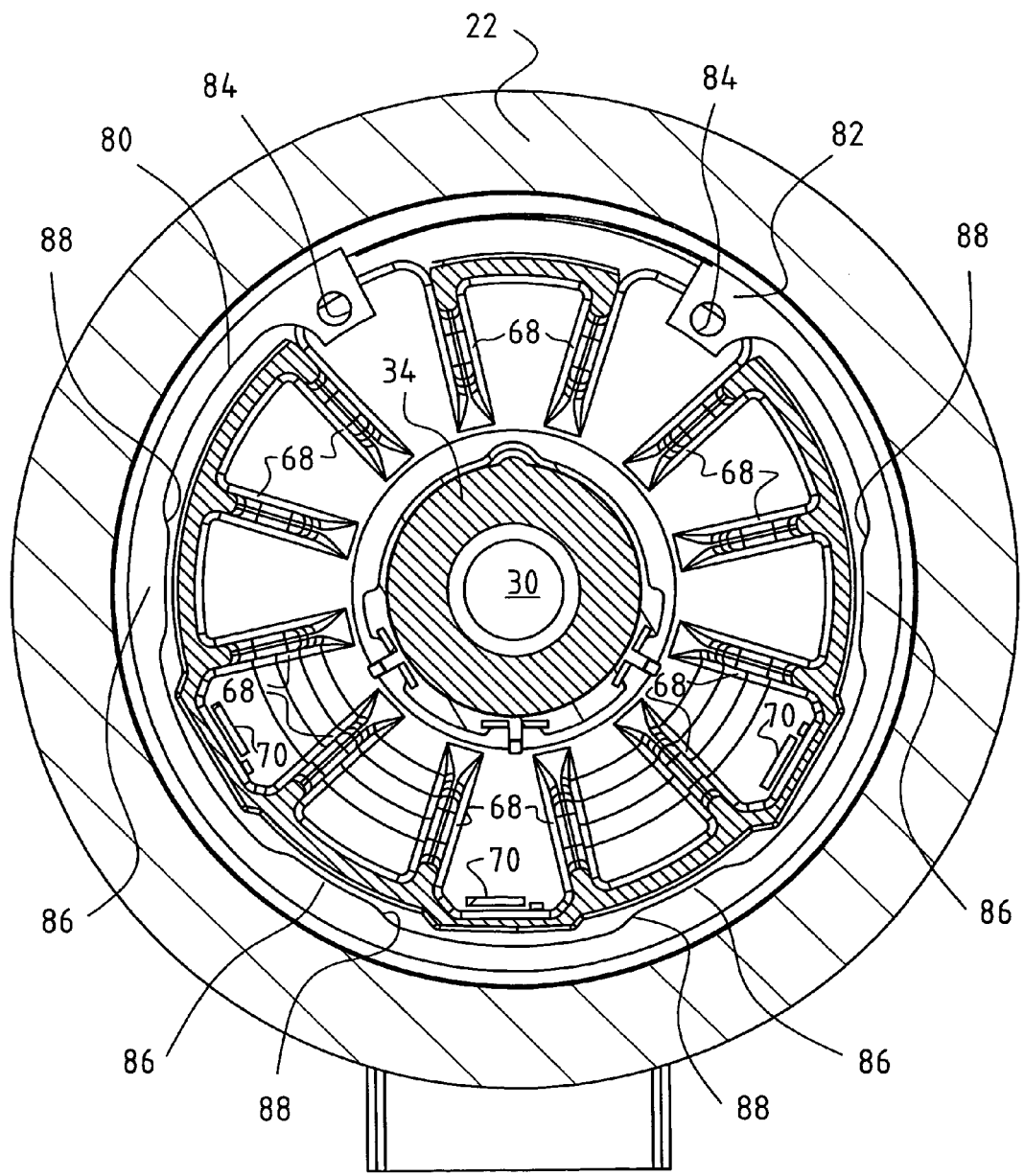
FIG. 3 is a section viewed along line III—III of FIG. 2, at greatly enlarged scale.

Extending between rim 64 and depression 62 are twelve radially extending stiffening ribs 68 which are arranged, as shown in FIG. 3, at regular intervals of 30°, and whose shape is clearly evident from FIG. 7. They have approximately the profile of an armchair.

Figure 4:
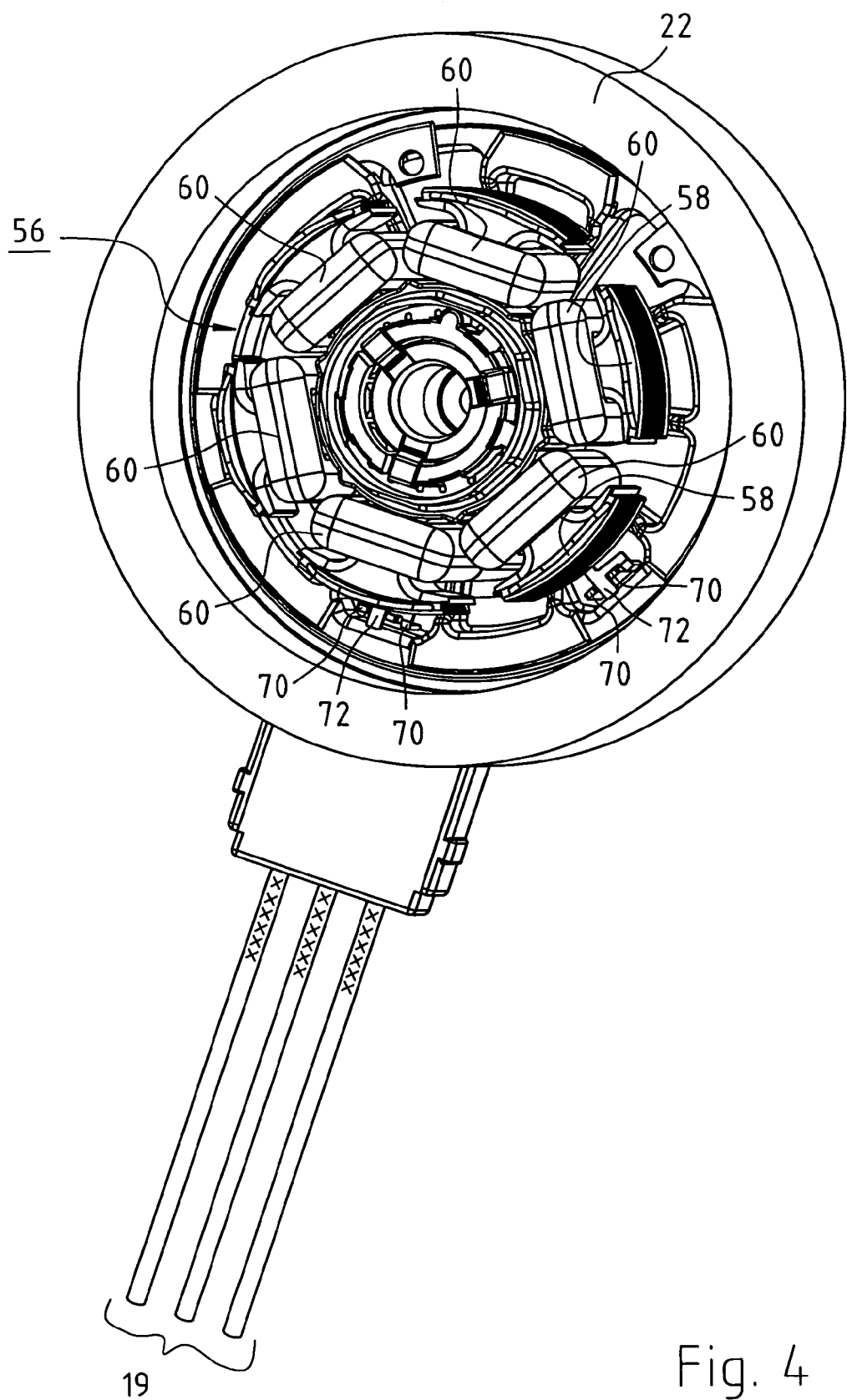
FIG. 4 is a perspective depiction of the stator on the motor according to FIGS. 1 to 3, i.e. prior to installation of the external rotor.

As FIGS. 3 and 4 show, electrical connecting elements 70, on each of which is mounted a connecting line 72 for one of the coils 60, extend between adjacent reinforcing ribs 68. A total of three connecting elements 70, electrically connected to lines 19, are mounted in flange 36.

Figure 11:
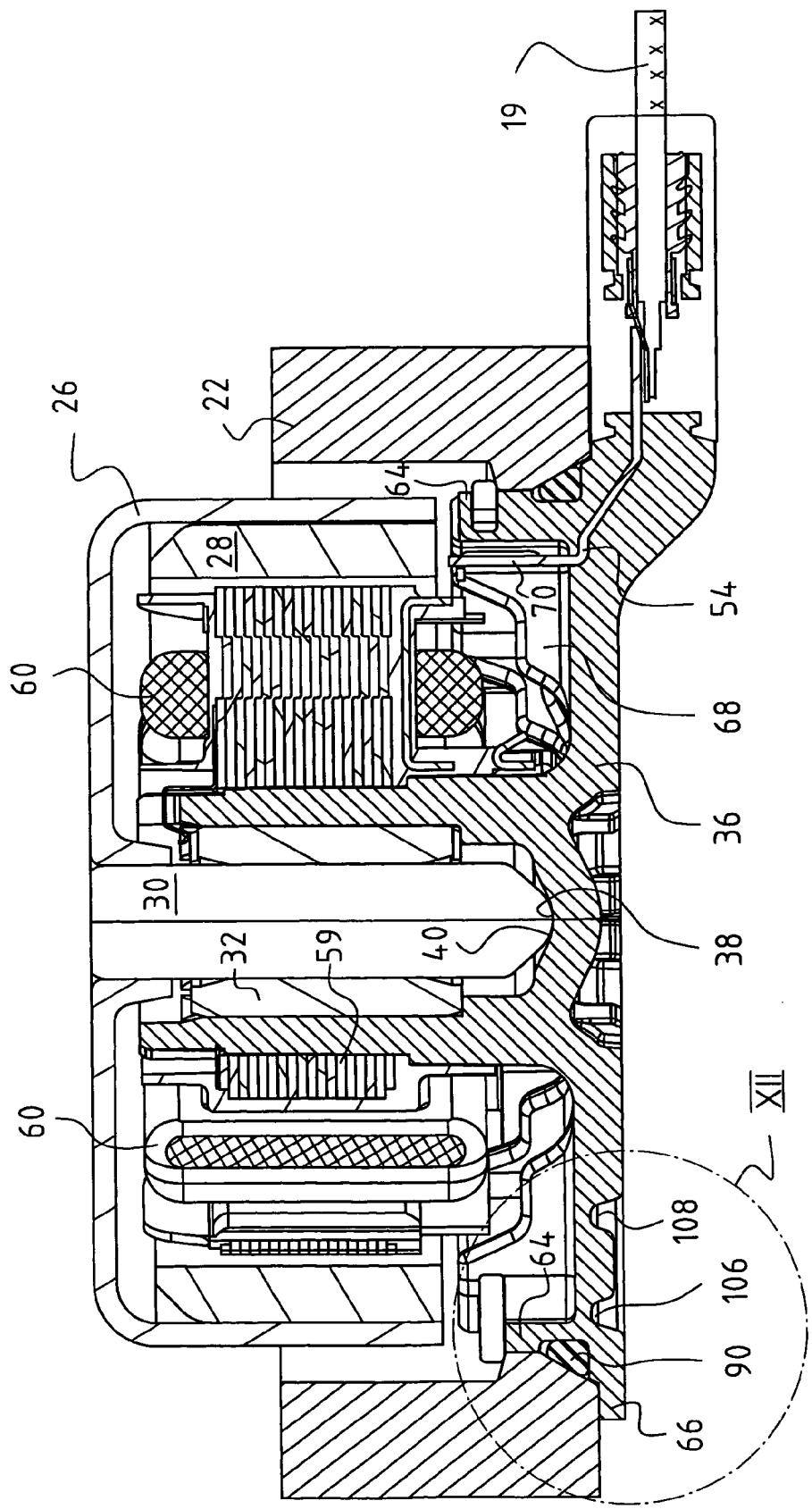
FIG. 11 is a section viewed along line XI—XI of FIG. 5.

FIG. 11 shows the routing of one of connecting elements 54, 70 in flange 36. The result is to prevent, in very simple fashion and without additional cost, infiltration or penetration of liquid into motor 20 in the region of these connecting elements.

Stator poles 58 are elements of a stator lamination stack 59 that is pressed, in the manner depicted in FIG. 7, onto outer side 74 of bearing tube 34. Lamination stack 59 is provided, as shown in FIG. 7, with an insulating layer 76 that serves as a coil former for coils 60.

Provided on outer periphery 78 of upwardly projecting rim 64 of flange 36 is a recess 80, similar to an annular groove, in which is arranged a resilient snap-locking element 82 whose shape is best gathered from FIG. 3. It is shaped approximately like a C, or like a circle interrupted at one point. It is produced from resilient material, usually steel, and can move, relative to groove 80, within predetermined limits. A preferred embodiment is a snap ring, but one could also use a conical ring. Various alternatives are known in the leaf spring art.

Figure 13:
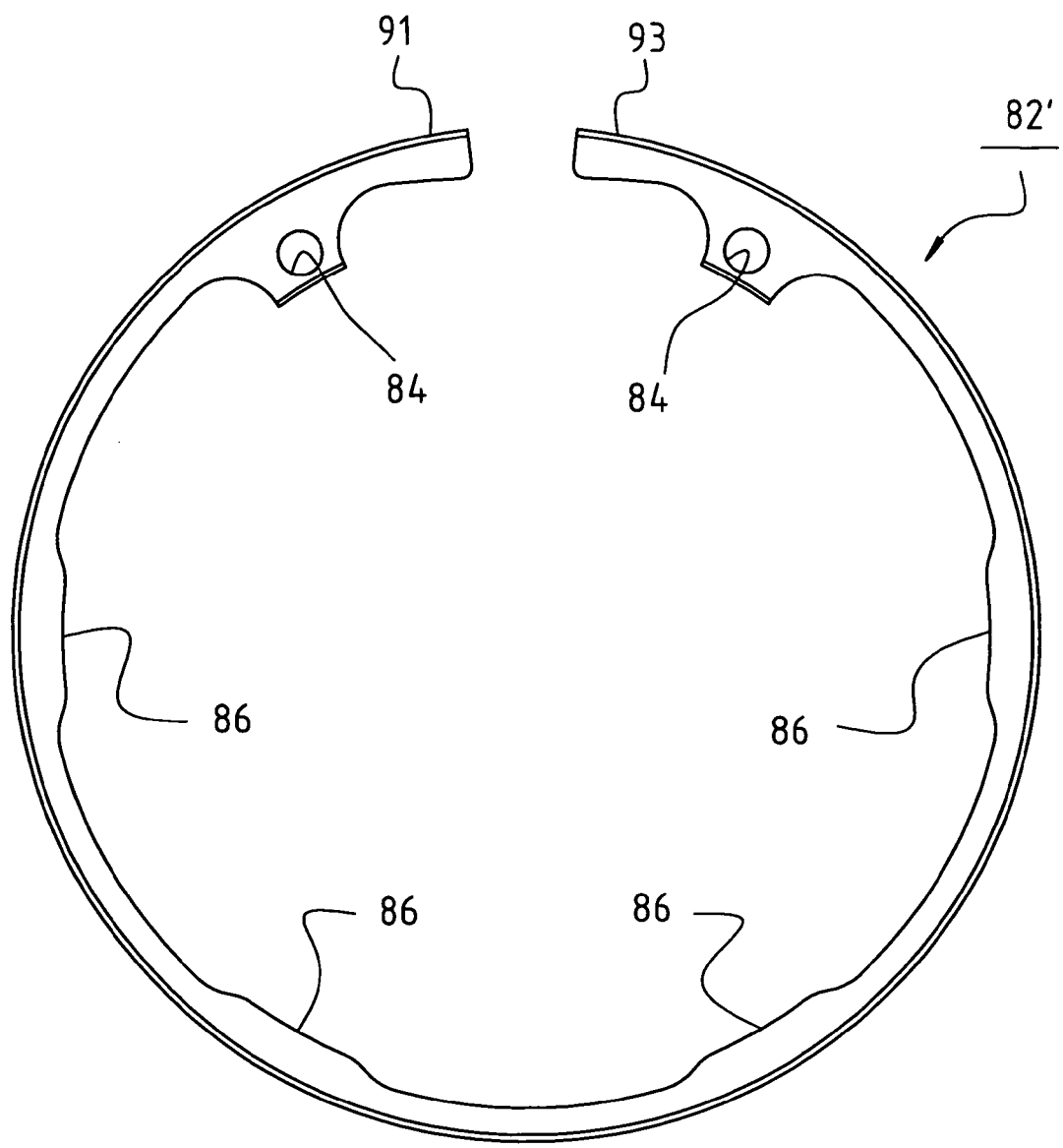
FIG. 13 shows a preferred variant of the snap ring that is used.

FIG. 13 shows a variant 82' of this snap-lock element that has advantages for many applications.

As FIG. 3 shows, the resilient snap-locking element has two actuation openings 84 into which a tool (not shown) can be introduced, in order to move these actuation openings 84 toward one another, as is necessary when opening the snap-lock system (see description below).

Snap-lock element 82, like snap-lock element 82' of FIG. 13, has four enlargements 86 that project radially inward. Annular groove-shaped recess 80 has corresponding depressions 88 into which these enlargements 86 engage, thereby preventing snap-lock element 82 (or 82') from rotating in groove or recess 80. This is advantageous because special openings must be made through flange 36 for access to actuation openings 84, and when those openings have been created by the breaking of a defined break point, actuation openings 84 must be located directly behind them, so that a tool can be placed onto them.

In FIG. 13, snap-lock element 82' additionally has an extension 91 to the right in the region of left opening 84, and an extension 93 to the left in the region of right opening 84. Extensions 91, 93 are also guided in recess 80. It has been found that additional guidance of this kind in the region of openings 84 can be advantageous in many cases.

Figure 8:
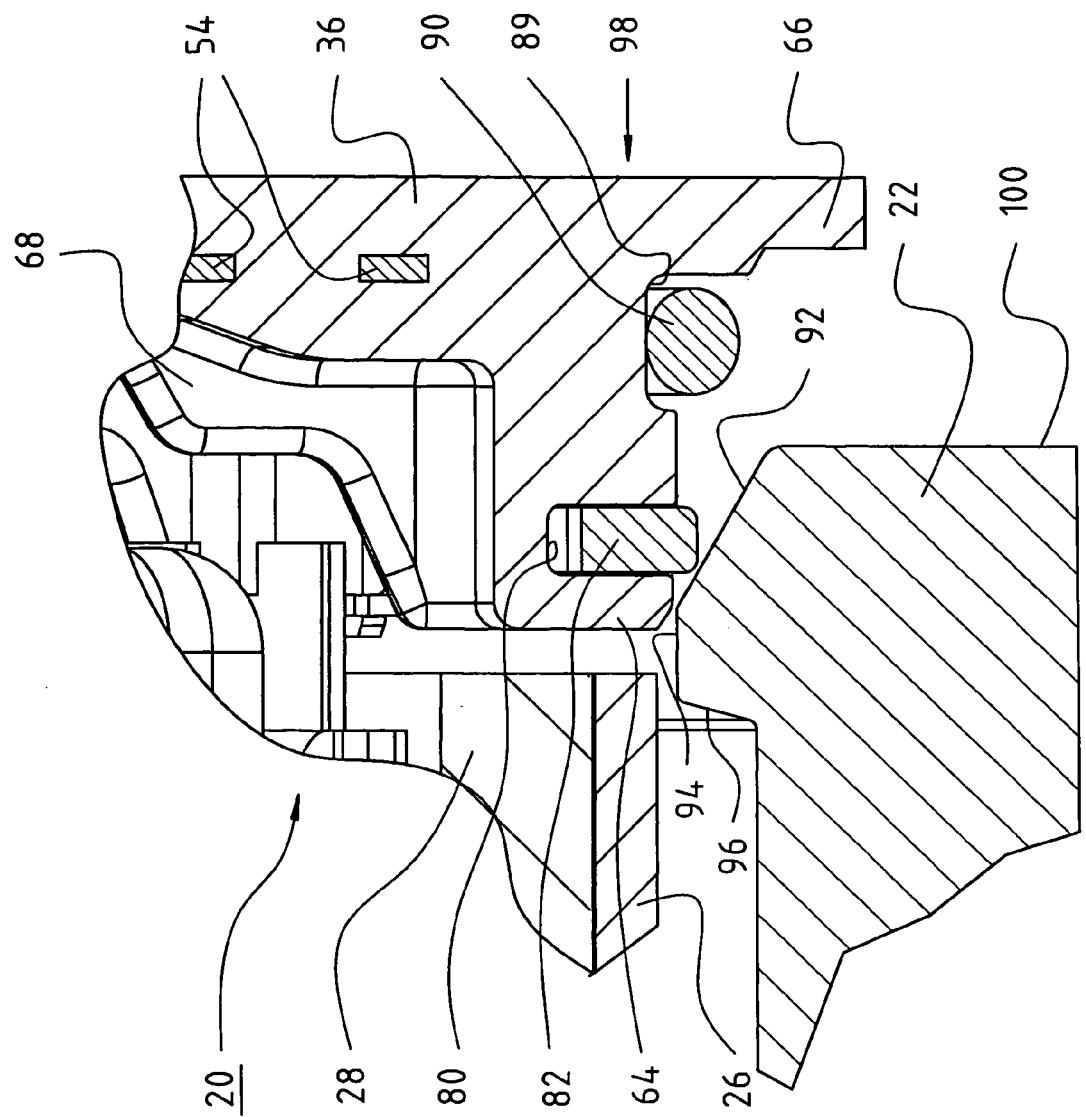
FIG. 8 is an enlarged depiction of the detail labeled X in FIG. 7, but (unlike in FIG. 7) before installation.

As shown in FIGS. 7–8, an elastic sealing member 90, e.g. an O-ring, is arranged on the outer periphery of support flange 36 in an annular groove 89. Ring or mount 22 also has, on its side facing away from motor 20, a ramped, frustoconical surface 92 that widens in the direction away from motor 20. This ramped surface serves as a guide during insertion of motor 20 through opening 94. In the direction toward motor 20, this surface 92 transitions into a cylindrical segment 94 (FIG. 8), adjoining which is a second frustoconical surface that forms a diagonally tapered shoulder 96 whose diameter widens toward motor 20.

Figure 9:
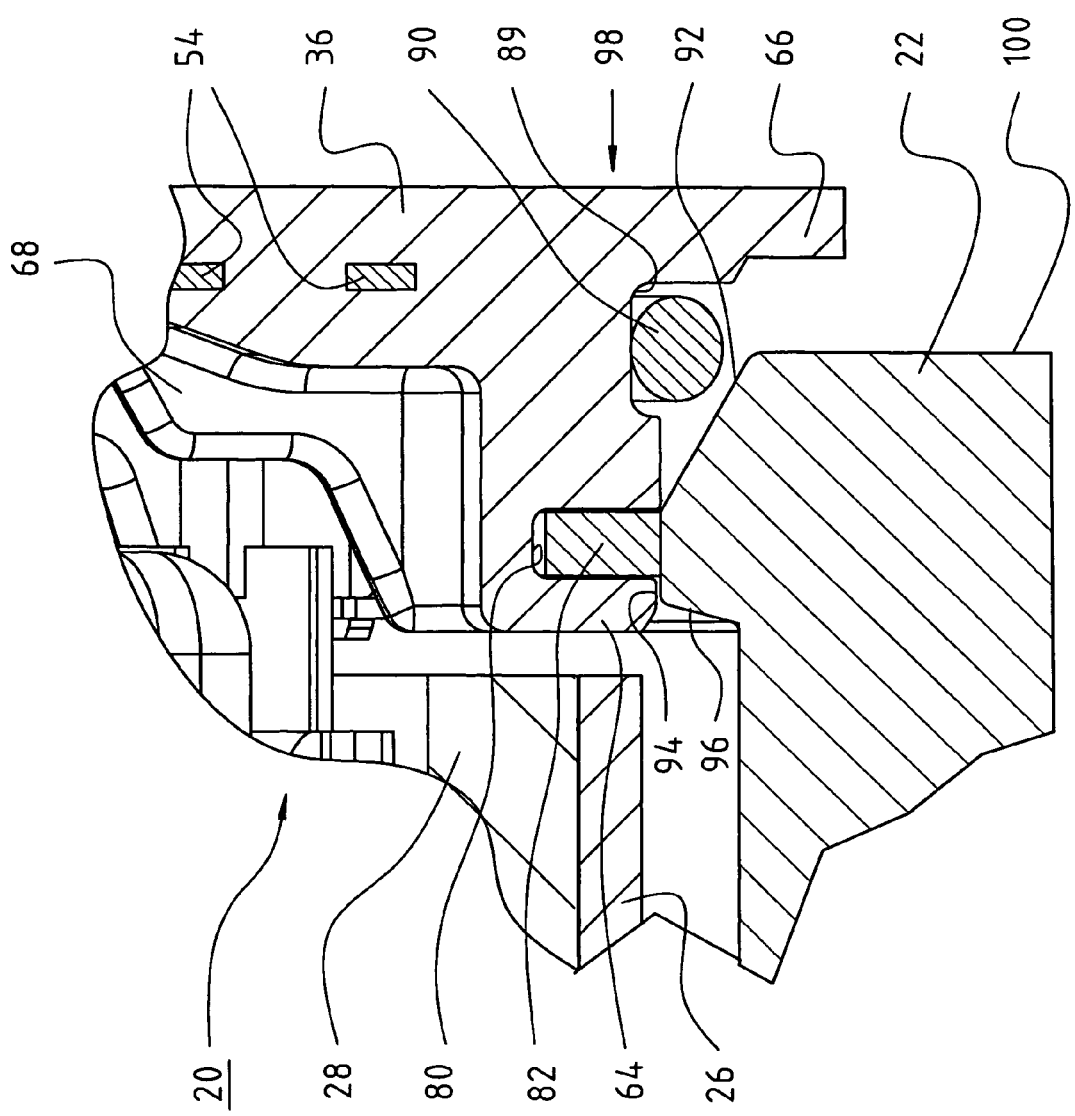
FIG. 9 is an enlarged depiction analogous to FIG. 8, but (unlike in FIGS. 7 and 8) during installation.
Figure 10:
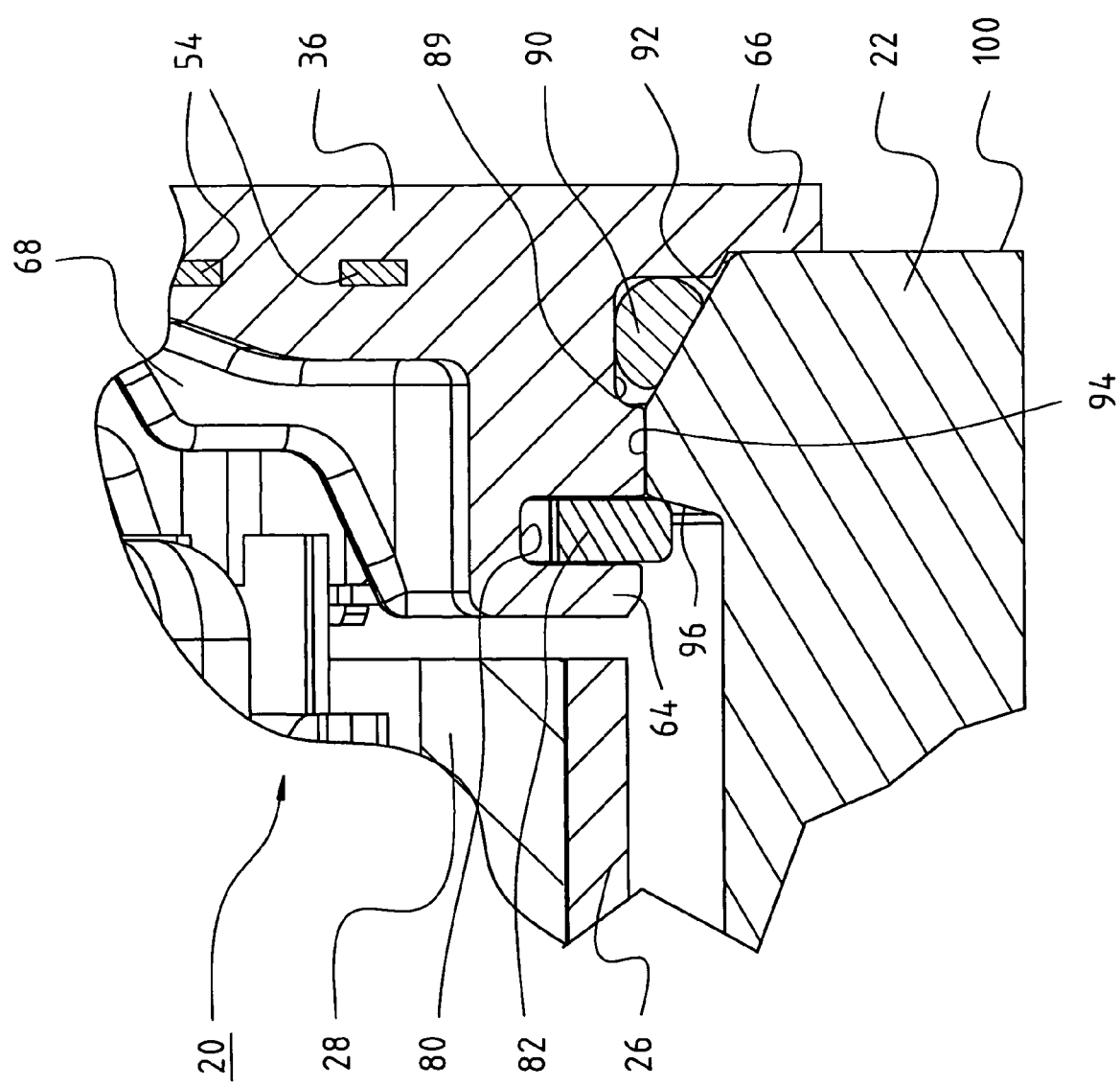
FIG. 10 is an enlarged depiction of the detail labeled X in FIG. 7, i.e. after installation is complete.

FIGS. 8 through 10 show the procedure during installation. According to FIG. 8, support flange 36, with motor 20 mounted on it, is inserted, along the direction indicated by arrow 98, into cylindrical opening 94 of ring 22. Resilient ring 82 is thereby radially inwardly compressed by contact with frustoconical surface 92 until, as shown in FIG. 9, it fits within cylindrical opening 94, and can be pushed axially through it.

Resilient ring 82 ultimately ends up in the position shown in FIG. 10. Here, resilient ring 82 can once again partially relax or rebound, and makes contact with a preload against tapered shoulder 96. At the same time, sealing ring 90 is compressed between annular groove 89 and frustoconical surface 92, thus forming a secure seal. This keeps contaminants and moisture out of the motor-side space (MS). Flange segment 66 also makes contact against the flat end face 100 of ring 22, or forms a narrow gap therewith. Clamping ring member 82, as a result of its spring action, maintains an axial force on elastic sealing member 90. This axial force also causes immovable retention of flange 36 in opening 94, and prevents flange 36 from wobbling in opening 94.

An arrangement of this kind thus enables a "blind" installation of motor 20 on ring 22 that proceeds very quickly since, after installation, it is necessary only to connect lines 19, which is usually done by means of a plug connector (not shown). This type of mounting is very secure and cannot disengage by itself. It also maintains a constant load on sealing ring 90 and is fluid-tight, so that the parts inside housing 50 (FIG. 2) do not become soiled.

Contributing to this is the fact that motor 20 has no collector and no carbon brushes. It is also very advantageous that resilient ring 82 or 82' is located inside housing 50 (the protected motor-side space) and therefore cannot corrode. This is desirable because, in many cases, it is necessary to remove motor 20 for repair or even simply for inspection.

For that purpose, support flange 36 has, in the region of openings 84 in elastic ring 82, frangible areas 102, 104 (FIG. 5) that can be broken out along defined break lines. The result is to create two openings (not shown) through which a tool can be inserted into openings 84 of elastic ring 82. Ring 82 is thereby radially compressed in the region of its openings 84, so that it disengages from frustoconical shoulder 96, and motor 20 can be pulled out through cylindrical opening 94.

If it is found that motor 20 is OK, the openings that were broken out of flange 36 can be temporarily closed off, and motor 20 can be reinstalled. Motor 20 must then be replaced, when the opportunity arises, with another motor having an intact flange 36.

Figure 5:
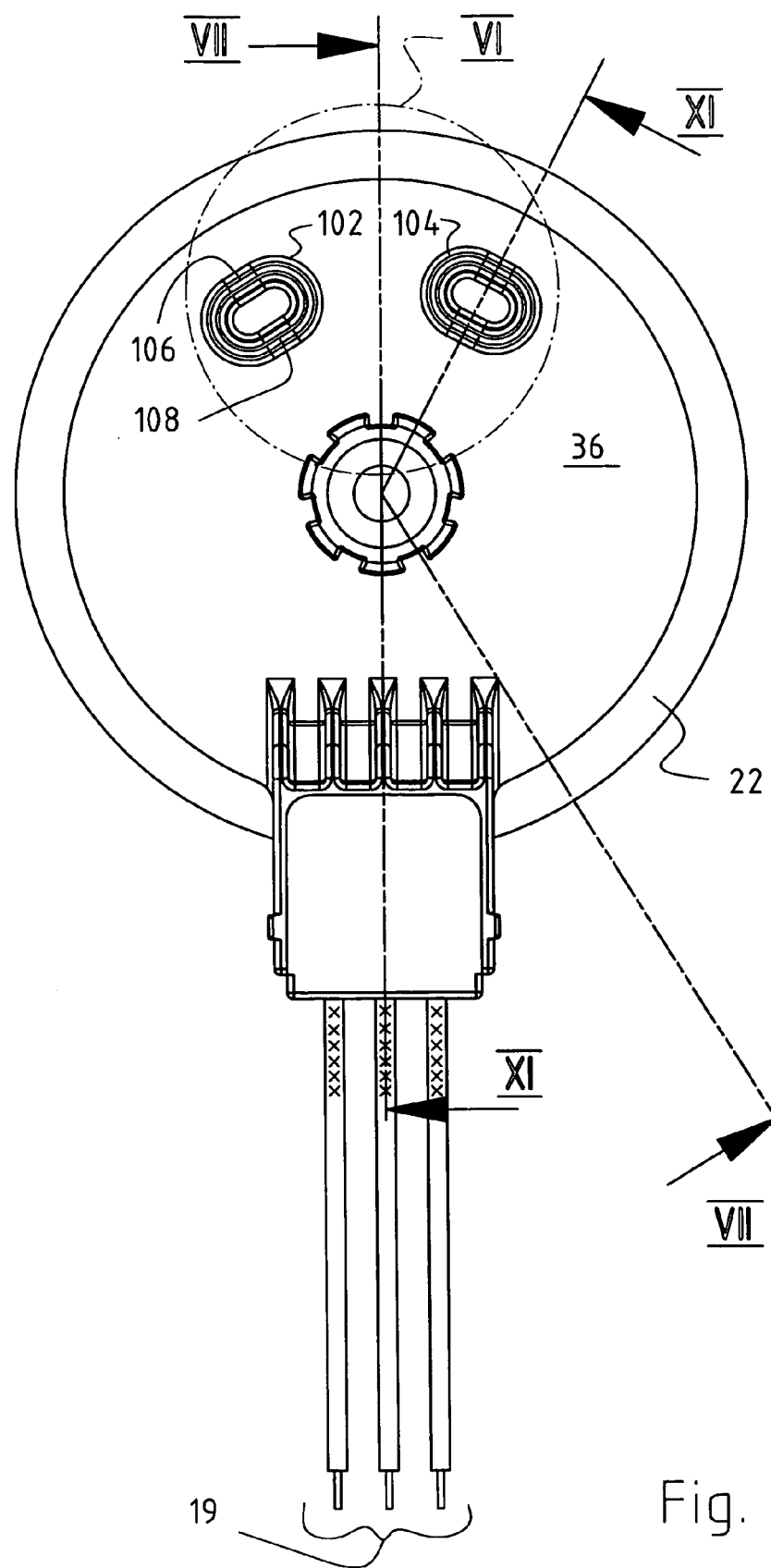
FIG. 5 is a plan view of the installed motor looking in the direction of arrow V of FIG. 2, at a scale greater than in FIGS. 1 and 2.
Figure 6:
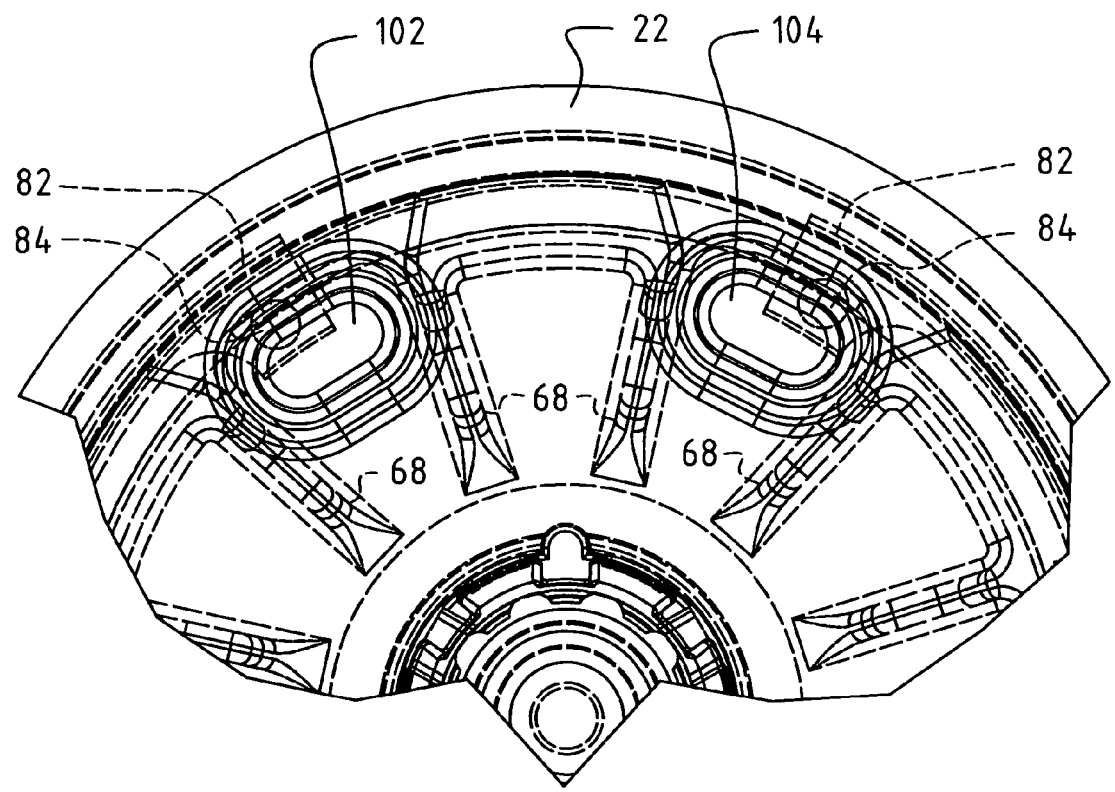
FIG. 6 depicts a detail labeled VI in FIG. 5.
Figure 12:
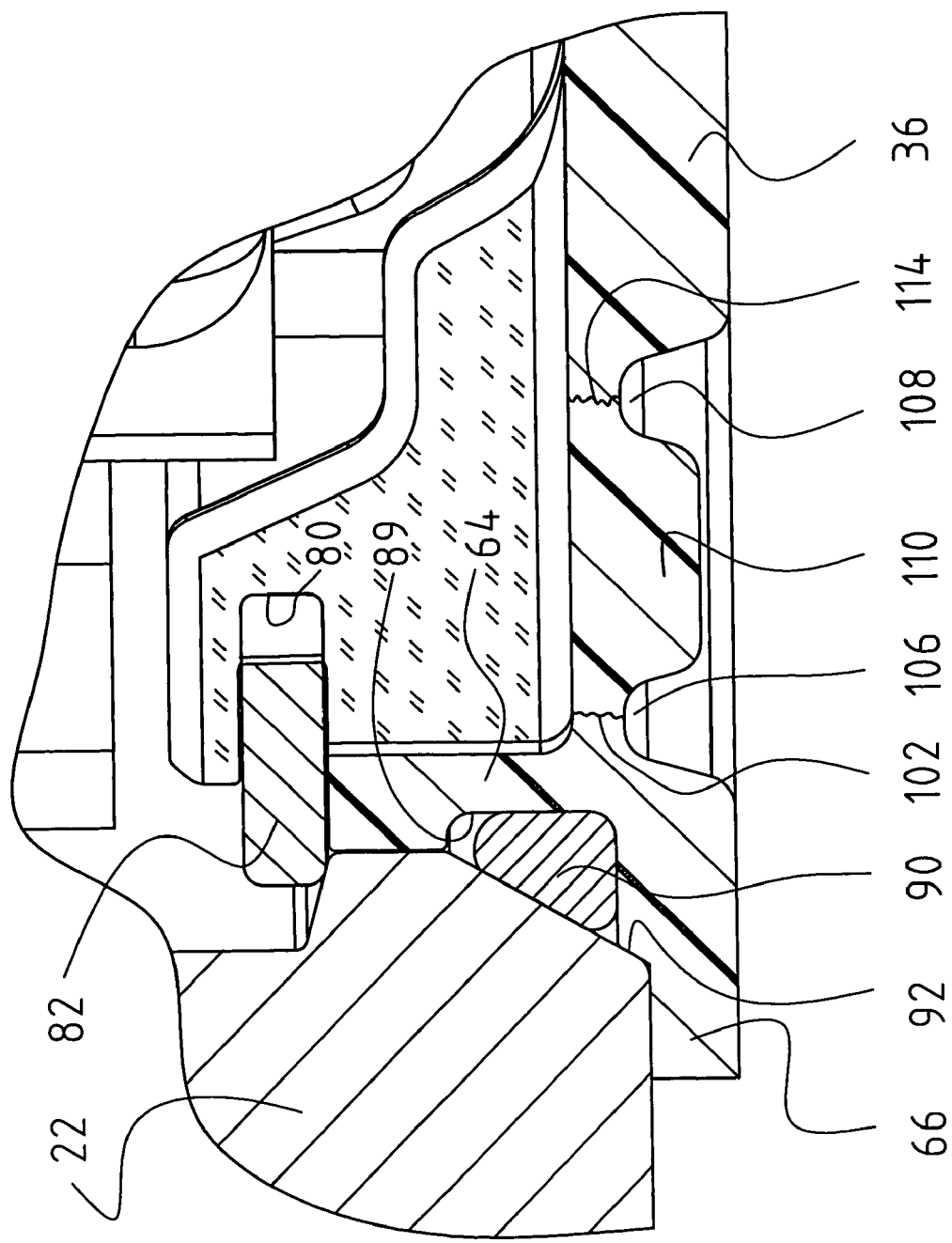
FIG. 12 is an enlarged depiction of a detail that is labeled XII in FIG. 11 and shows an embodiment of a defined break point, provided in the support flange, with which an opening can be broken out of the support flange.

FIG. 11 and FIG. 12 show, in flange 36, two trough-like depressions 106, 108 whose location on the flange is apparent from FIG. 5 and FIG. 6. Located between these depressions is a thicker segment 110, and by pressing on this, segment 110 can be broken out along defined break lines 112, 114, thus creating the above-described opening.

FIG. 6 shows the location of areas 102, 104 relative to radial stiffening ribs 68 and openings 84 of snap ring 82. After installation, openings 84 are each located between two stiffening ribs 68, as are areas 102, 104.

Numerous variants and modifications are, of course, possible within the scope of the present invention.

What is claimed is:

1. A motor mounting arrangement comprising
an electric motor (20) having a support flange (36) associated therewith, said support flange having a circumference; and
a snap-lock element (82) for securing said support flange within an opening (94) formed in a mount (22) annularly surrounding said motor,
wherein
a circumferential surface of the flange (36) is configured for mounting in said opening (94);
a central plane (P) through said opening (94) separates a motor-side space (MS) from a flange-side space (FS);
said mount (22) is formed with a substantially frustoconical shoulder (96) in said motor-side space (MS);
and the snap-lock element (82) extends circumferentially along at least a portion of said circumference, is resiliently deflectable in a radially inward direction, and is adapted to lock against said frustoconical motor-side shoulder (96) when said motor (20) is mounted in said opening (94).

2. The arrangement according to claim 1, wherein the support flange (36) is provided with a radial enlargement (66) which is so configured that, when said motor is mounted in said opening, said radial enlargement extends on a side of the opening that is axially remote from the motor.

3. The arrangement according to claim 1, wherein the snap-lock element is implemented as a snap ring (82; 82').

4. The arrangement according to claim 1, wherein the snap-lock element (82; 82') is implemented as a conical ring.

5. The arrangement according to claim 1, wherein the snap-lock element (82; 82') is formed with at least one engagement opening (84) for engagement of an actuation tool.

6. The arrangement according to claim 5, wherein the snap-lock element (82; 82') has approximately the shape of a C, and is formed with an engagement opening (84) on each limb of the C.

7. The arrangement according to claim 5, wherein the support flange (36) is equipped with at least one defined break location (112, 114), by the breaking of which an opening is creatable through which an engagement opening (84) of the snap-lock element (82; 82') is accessible.

8. The arrangement according to claim 7, wherein the support flange (36) is equipped in at least two areas (102, 104) with defined break locations (112, 114) which make possible the creation of two openings for access to two engagement openings (84) of the snap-lock element (82; 82').

9. The arrangement according to claim 1, wherein
a sealing element (90) is arranged between a periphery of the support flange (36) and the opening (94).

10. The arrangement according to claim 9, wherein said sealing element (90) hermetically seals off said motor-side space (MS) from said flange-side space.

11. The arrangement according to claim 9, wherein the sealing element is implemented as an O-ring (90) arranged in a groove (89) on the peripheral circumference of the support flange (36).

12. The arrangement according to claim 9, wherein
the sealing element (90) is formed of elastic material and is so configured that a load is applied to it, as a result of contact of the snap-lock element (82; 82') against the frusto-conical motor-side shoulder (96) of the opening (94).

13. The arrangement according to claim 1, wherein the snap-lock element (82; 82') is a radially resilient part.

14. The arrangement according to claim 12, wherein
the radially resilient part (82; 82') is equipped with radially inwardly projecting protrusions (86) that are in engagement with corresponding depressions (88) of a recess (80) provided for reception of the snap-lock element (82; 82').

15. The arrangement according to claim 14, wherein the recess, provided for reception of the radially resilient part (82; 82'), is implemented, at least locally, as an annular groove (80).

16. The arrangement according to claim 1, wherein
the opening (94), provided for reception of the support flange (36), is formed, on its side serving for introduction of the support flange (36), with a ramped, substantially frustoconical surface (92).

17. The arrangement according to claim 1, wherein the electric motor is implemented as an external-rotor motor (20) having an external rotor (24) and an internal stator (56), which stator is secured to the support flange (36).

18. The arrangement according to claim 17, wherein the external rotor (24) comprises a shaft (30), and wherein a bearing tube (34), in which that shaft (30) is journaled, is arranged on the support flange (36).

19. The arrangement according to claim 18,
wherein the bearing tube (34) is formed integrally with the support flange (36) and is closed off in fluid-tight fashion at its end facing toward the support flange (36).

20. The arrangement according to claim 1,
wherein the internal stator (56) is configured so as to pull the external rotor (24) toward the support flange (36) by exerting a magnetic force.

21. The arrangement according to claim 20,
wherein, for generation of the magnetic force, at least one permanent magnet (28) of the external rotor (24) is axially offset relative to ferromagnetic elements (59) of the internal stator (56).

22. A motor mounting arrangement comprising
an electric motor (20) having a support flange (36) associated therewith, said support flange having a circumference; and
a snap-lock element (82) for securing said support flange within an opening (94) formed in a mount (22) annularly surrounding said motor,
wherein
a circumferential surface of the flange (36) is configured for mounting in said opening (94);
a central plane (P) through said opening (94) separates a motor-side space (MS) from a flange-side space (FS);
said mount (22) is formed with a substantially frustoconical shoulder (96) in said motor-side space (MS);
and the snap-lock element (82) extends circumferentially along at least a portion of said circumference, is formed with at least one engagement opening (84) for engagement of an actuation tool, is resiliently deflectable in a radially inward direction, and is adapted to lock against said frustoconical motor-side shoulder (96) when said motor (20) is mounted in said opening (94).

23. The arrangement according to claim 22, wherein the snap-lock element (82; 82') has approximately the shape of a C, and is formed with an engagement opening (84) on each limb of the C.

24. The arrangement according to claim 22, wherein the support flange (36) is equipped with at least one defined break location (112, 114), by the breaking of which an opening is creatable through which an engagement opening (84) of the snap-lock element (82; 82') is accessible.

25. The arrangement according to claim 22, wherein the support flange (36) is equipped in at least two areas (102, 104) with defined break locations (112, 114) which make possible the creation of two openings for access to two engagement openings (84) of the snap-lock element (82; 82').

26. A motor mounting arrangement comprising
an electric motor (20) having a support flange (36) associated therewith, said support flange having a circumference; and
a snap-lock element (82) for securing said support flange within an opening (94) formed in a mount (22) annularly surrounding said motor,
wherein
a circumferential surface of the flange (36) is configured for mounting in said opening (94);
a central plane (P) through said opening (94) separates a motor-side space (MS) from a flange-side space (FS);
a sealing element (90) is arranged between a periphery of the support flange (36) and the opening (94);
said mount (22) is formed with a substantially frustoconical shoulder (96) in said motor-side space (MS);
and the snap-lock element (82) extends circumferentially along at least a portion of said circumference, is resiliently deflectable in a radially inward direction, and is adapted to lock against said frustoconical motor-side shoulder (96) when said motor (20) is mounted in said opening (94).

27. The arrangement according to claim 26, wherein said sealing element (90) hermetically seals off said motor-side space (MS) from said flange-side space.

28. The arrangement according to claim 26, wherein the sealing element is implemented as an O-ring (90) arranged in a groove (89) on the periphery circumference of the support flange (36).

29. The arrangement according to claim 26, wherein
the sealing element (90) is formed of elastic material and is so configured that a load is applied to it, as a result of contact of the snap-lock element (82; 82') against the frusto-conical motor-side shoulder (96) of the opening (94).

* * * * *